(12) United States Patent
Barnes

(10) Patent No.: US 11,613,073 B2
(45) Date of Patent: Mar. 28, 2023

(54) METHOD AND APPARATUS FOR BUILD MATERIAL HEATING

(71) Applicant: HEWLETT-PACKARD DEVELOPMENT COMPANY, L.P., Spring, TX (US)

(72) Inventor: Arthur H. Barnes, Vancouver, WA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 16/608,351

(22) PCT Filed: Jan. 24, 2018

(86) PCT No.: PCT/US2018/015013
§ 371 (c)(1),
(2) Date: Oct. 25, 2019

(87) PCT Pub. No.: WO2019/147233
PCT Pub. Date: Aug. 1, 2019

(65) Prior Publication Data
US 2021/0276250 A1 Sep. 9, 2021

(51) Int. Cl.
*B29C 64/153* (2017.01)
*B33Y 10/00* (2015.01)
(Continued)

(52) U.S. Cl.
CPC .......... *B29C 64/153* (2017.08); *B29C 64/245* (2017.08); *B29C 64/295* (2017.08);
(Continued)

(58) Field of Classification Search
CPC ... B29C 64/153; B29C 64/245; B29C 64/295; B33Y 10/00; B33Y 30/00; B33Y 70/00;
(Continued)

(56) References Cited

U.S. PATENT DOCUMENTS 3,437,072 A 4/1969 Levinson
3,449,546 A 6/1969 Dhoble
(Continued)

FOREIGN PATENT DOCUMENTS

CN 1934404 A 3/2007
CN 106061714 A 10/2016
(Continued)

OTHER PUBLICATIONS

Chua, Z.Y. et al.,Process Monitoring and Inspection Systems in Metal Additive Manufacturing: Status and Applications, Apr. 11, 2017, https://link.springer.com/article/10.1007/s.
(Continued)

*Primary Examiner* — Leith S Shafi
*Assistant Examiner* — Xinwen Ye
(74) *Attorney, Agent, or Firm* — Shook, Hardy & Bacon L.L.P.

(57) ABSTRACT

A plate disposed between a lamp and a material to be heated is disclosed. The material absorbs a portion of the energy from the lamp and reflects a second portion of the energy. The plate absorbs the reflected energy and transmits the reflected energy back to the material.

13 Claims, 11 Drawing Sheets

(51) Int. Cl.
  *B33Y 30/00* (2015.01)
  *B33Y 70/00* (2020.01)
  *B29C 64/245* (2017.01)
  *B29C 64/295* (2017.01)
  *B29K 77/00* (2006.01)

(52) U.S. Cl.
  CPC ............... *B33Y 10/00* (2014.12); *B33Y 30/00* (2014.12); *B33Y 70/00* (2014.12); *B29K 2077/00* (2013.01)

(58) Field of Classification Search
  CPC ..... B29K 2077/00; G03F 1/52; G03F 7/2008; G03F 7/702
  USPC ........................................................ 264/405
  See application file for complete search history.

(56) References Cited

U.S. PATENT DOCUMENTS

| | | | |
|---|---|---|---|
| 4,882,852 A | | 11/1989 | Kautto |
| 2005/0023267 A1* | | 2/2005 | Timans ............. H01L 21/67115 |
| | | | 219/390 |
| 2015/0062943 A1* | | 3/2015 | Takahira ................... F21V 9/30 |
| | | | 362/510 |
| 2015/0140155 A1* | | 5/2015 | Ohno .................... B29C 64/264 |
| | | | 425/375 |
| 2016/0114535 A1 | | 4/2016 | Kritchman et al. |
| 2016/0339642 A1 | | 11/2016 | Donovan |
| 2016/0349724 A1 | | 12/2016 | Cortes et al. |
| 2017/0113410 A1* | | 4/2017 | Fruth .................... B29C 64/236 |
| 2018/0186082 A1* | | 7/2018 | Randhawa ........... B23K 26/125 |

FOREIGN PATENT DOCUMENTS

| | | | | |
|---|---|---|---|---|
| CN | 106608044 A | | 5/2017 | |
| CN | 107548347 A | | 1/2018 | |
| EP | 0554538 B1 | | 8/1993 | |
| EP | 1674192 B1 * | | 8/2009 | ............. B22F 3/004 |
| GB | 971720 A | | 10/1964 | |
| JP | 3578590 B2 * | | 10/2004 | ............ B33Y 50/02 |
| WO | WO2003028981 A1 | | 4/2010 | |
| WO | WO-2013144798 A1 | | 10/2013 | |
| WO | WO2016075563 A1 | | 5/2016 | |
| WO | WO-20170131764 A1 | | 8/2017 | |

OTHER PUBLICATIONS

"Infrared Radiation Heating Energy-Saving Technology", Industry Exchange, Beijing Energy Conservation, Jan. 1999, pp. 37-38.

* cited by examiner

100

200

500A

700

800A

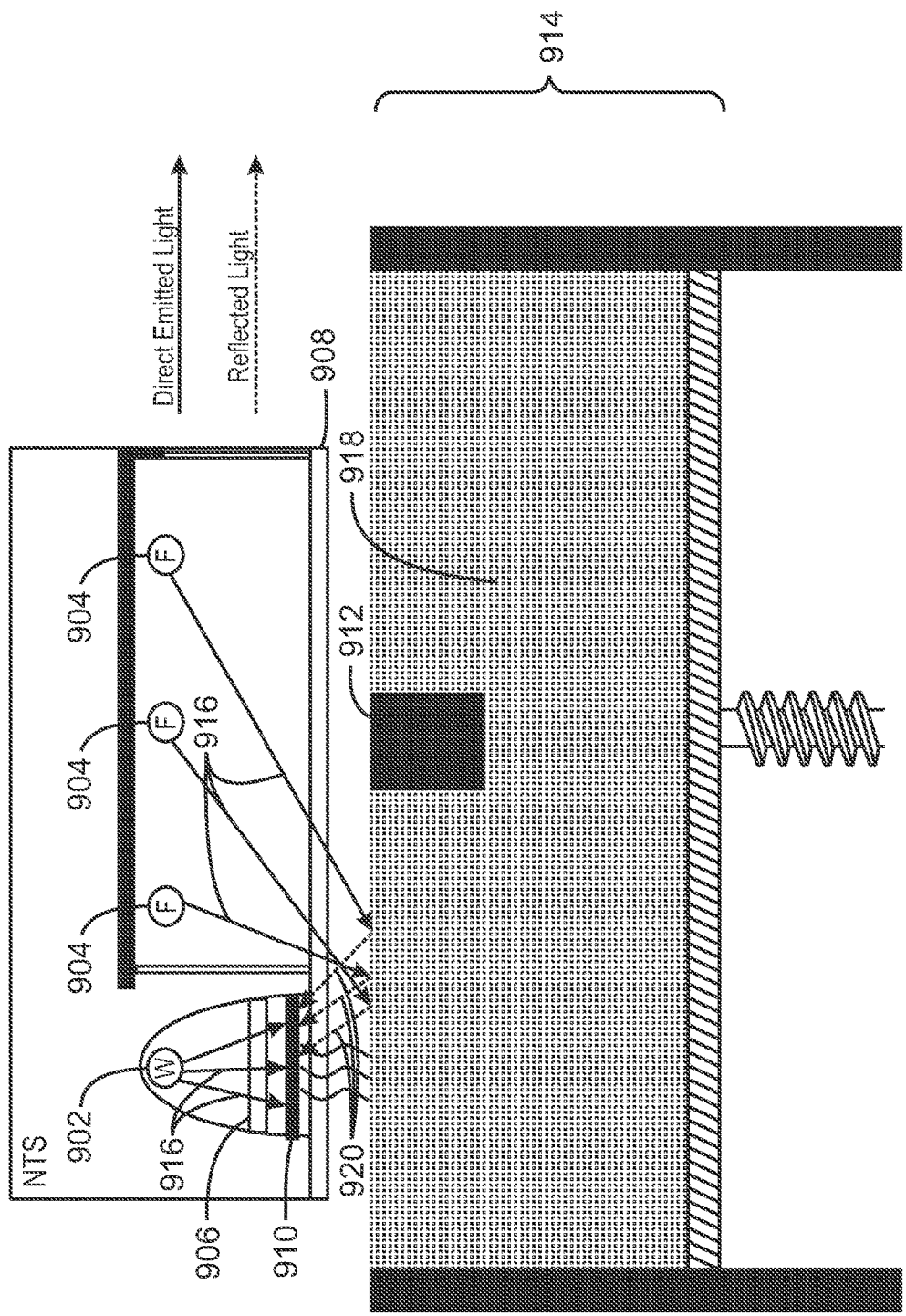

US 11,613,073 B2

METHOD AND APPARATUS FOR BUILD MATERIAL HEATING

BACKGROUND

In additive manufacturing, the build material utilized may be highly reflective in the infrared portion of the electromagnetic spectrum closer to visible light (between 0.75 and 3 um) and highly absorptive in infrared regions (between 3 and 8 um) of the electromagnetic spectrum.

For example, a common polymer used in additive manufacturing is known as PA12. Pa12 has relatively low energy absorption below 3.0 um, that is, below about 70%, with the absorption between 0.5 and 2 um being consistently below 50%. From 3.0-3.5 um, PA12 absorbs nearly 100% of those wavelengths. Above 4.0 um, PA12 absorbs typically 80%.

When infrared heating sources are utilized for warming of the build material, commonly available, inexpensive quartz infrared halogen lamps are typically utilized. These lamps come in various color temperatures which define the spectral power distribution of the lamp output. Common color temperatures are in the range of 1800° K-2700° K, with peak power of the lamps being produced between 1-2 um. Thus, these lamps produce ~70-90% of their power below 3.0 um.

BRIEF DESCRIPTION OF THE DRAWINGS

Certain examples are described in the following detailed description and in reference to the drawings, in which:

FIG. 9 is a simplified diagram of a fusing module of a printer utilizing the plate of FIG. 1, according to examples.

The same numbers are used throughout the disclosure and the figures to reference like components and features. Numbers in the 100 series refer to features originally found in FIG. 1, numbers in the 200 series refer to features originally found in FIG. 2, and so on.

DETAILED DESCRIPTION

In accordance with examples described herein, a plate is disposed between a warming lamp and build material to be heated by the lamp. The build material is highly absorptive in some infrared regions of the electromagnetic spectrum, and highly reflective in others. Fused quartz or other transparent material may be disposed on either side of the plate, to isolate heat toward the build material. The plate may be coated for better absorption. The plate mechanically both captures reflected energy off the build material and re-emits energy in the infrared region with wavelengths between 3 and 8 um, resulting in more efficient heating of the build material.

Figure 1:
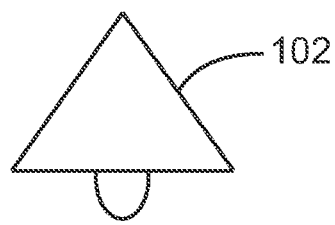
FIG. 1 is a simplified diagram of an apparatus used to capture and reuse reflected energy, according to some examples.
Figure 1:
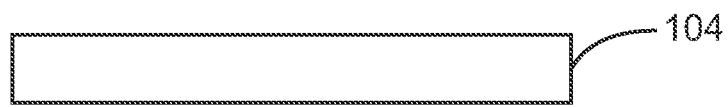
Figure 1:

FIG. 1 is a simplified diagram of an apparatus 100 used to capture and reuse reflected energy, according to examples. A plate 104 is disposed between a lamp 102 and a target zone, such as a build platform, upon which a layer of build material 106 may be formed. Build material 106, which may be a powder or powder-type material, is formed as a thin layer disposed on the build platform or other target zone.

The build material 106 may be a polymer or polymer-like substance, or may comprise other plastics, ceramics, or metals, in powder form. In some examples, the powder may be formed from, or may include, short fibers that may, for example, have been cut into short lengths from long strands or threads of material. The apparatus 100 of FIG. 1 may be employed with any of a number of materials that may be powdered or powder-like.

The lamp 102 provides a source of infrared emission to heat the build material 106. The lamp 102 may be used for fusing the build material (fusing lamp) or may be used to keep the build material at a certain temperature (warming lamp). In some examples, the lamp 102 is a quartz infrared halogen lamp.

Figure 2:
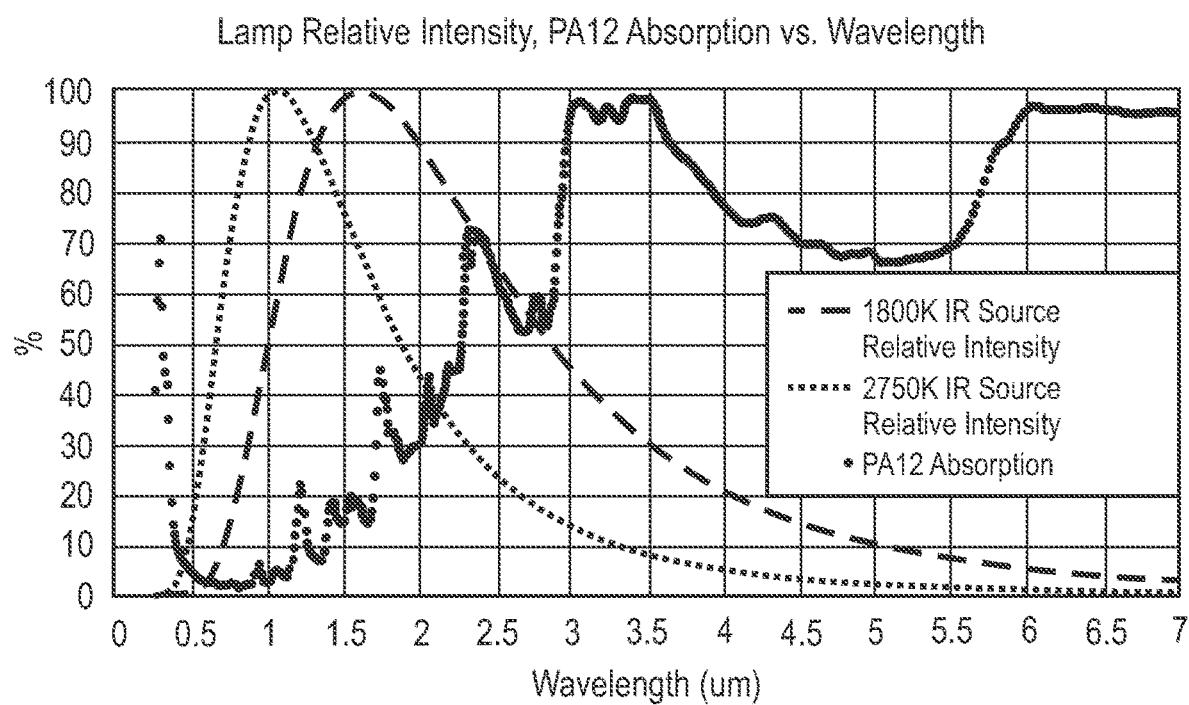
FIG. 2 is a graph illustrating the relative energy intensity of two quartz infrared halogen lamps relative to the energy absorption of a build material, according to some examples.

FIG. 2 is a graph 200 illustrating the relative energy intensity (i.e., energy emission) of two examples of quartz infrared halogen lamps, as well as the percent absorption (i.e., energy absorption) by a build material, according to examples. The two lamps comprise quartz infrared halogen lamps. A first quartz infrared halogen lamp has a color temperature of 1800° K (known herein as the "1800 lamp") with a peak power at 1.7 um (long dashed). A second quartz infrared halogen lamp has a color temperature of 2750° K (known herein as the "2750 lamp") with a peak power of 1.1 um (short dashed). In this example, the build material is a PA12 polymer (dotted).

The PA12 polymer has an absorption profile as shown. The dotted curve shows how much energy the build material will absorb at each wavelength. The graph shows that the PA12 polymer is highly absorptive above 3.0 um, but below 3.0 um, its absorption rate is relatively low. Between 3.0 and 3.5 um, the PA12 polymer has an absorption rate higher than 90%.

Two curves show the intensity of two lamps, the 1800 lamp (dashed) and the 2750 lamp (dotted). The graph 200 shows that the lamps 1800 and 2750 produce most of their energy when the PA12 build material is only slightly absorptive. Electrical power usage is driven upward to overcome the mismatch, which results in undesirable energy waste. For example, the energy absorbed by the build material from the 1800 and the 2750 lamps may be as low as 15-30%.

The graph 200 illustrates a mismatch between the infrared source emission spectrum of the 1800 and 2750 lamps and the absorption profile of the PA12 build material. The 1800 lamp provides peak power at 1.7 um while the 2750 lamp provides peak power at 1.1 um. So, both lamps are providing peak power in the wavelength in which the PA12 build material has low absorption. Conversely, where the PA12 build material is highly absorptive, at between 3 and 3.5 um, the relative intensity of the lamps is quite low, about 30-40% for the 1800 lamp and about 10-15% for the 2750 lamp.

Further, where the build material is not very absorptive, it also happens to be highly reflective. Thus, below 3.0 um, which is where the lamps provide the highest power, the PA12 polymer is highly reflective. Due to the mismatch between the lamps and the build material, energy that is intended to heat the build material, is wasted.

Figure 3:
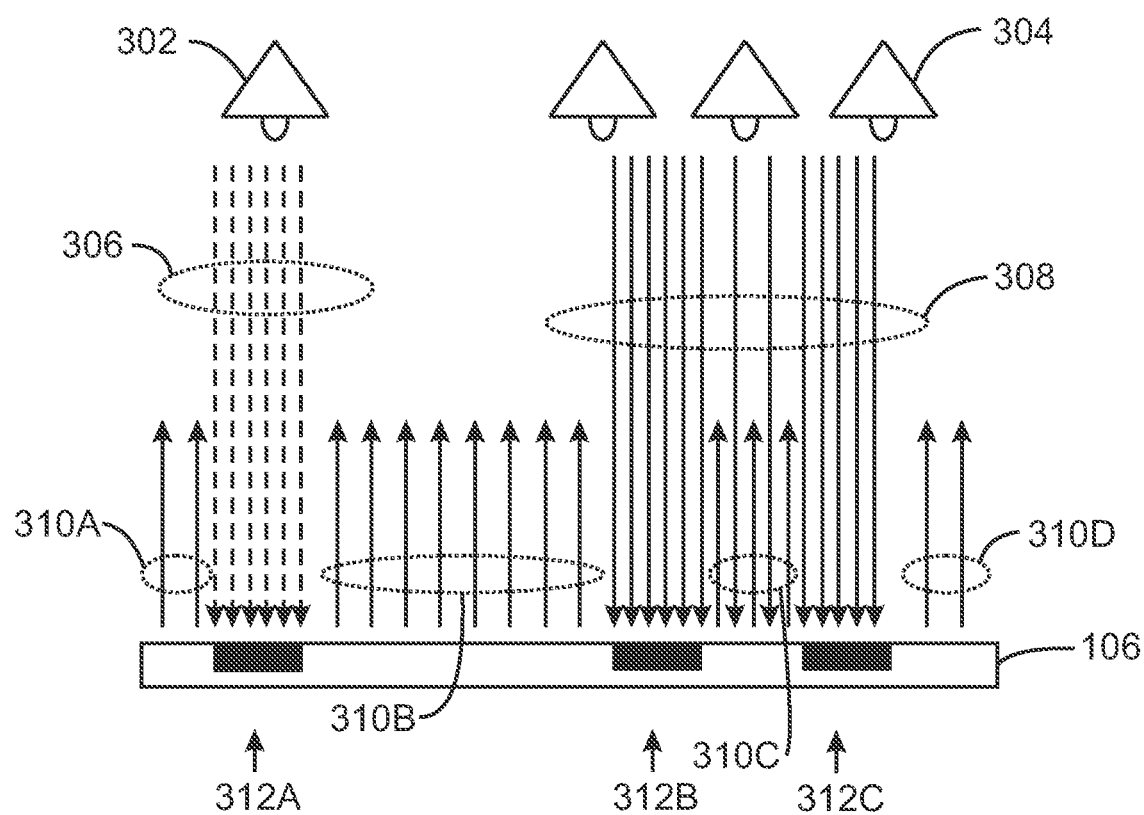
FIG. 3 is a simplified diagram of an apparatus to illustrate the effects of warming or fusing on build material, according to some examples.

FIG. 3 is a simplified diagram of an apparatus 300 to illustrate the effects of warming or fusing on build material, according to some examples. A warming lamp 302 is sending warming heat in the form of infrared energy 306 to the build material 106, shown as downward-facing dashed arrows. A group of three fusing lamps 304 is sending fusing heat 308 to the build material 106, shown as downward-facing solid arrows. Parts 312A-C are disposed in the build material 106 (collectively, "parts 312"). The parts 312 are formed by the deposition of an energy-absorbing liquid material, a fusing agent, upon the build material 106, followed by a melting of the fusing agent along with the build material, in selected locations. Fusing agents are sometimes known as binder or binding agents, and may include chemical binders that are heat cured. When fusing energy is applied, the portions of the build material 106 that absorbs enough energy to melt are those on which the fusing agent has been applied. Build material in which no fusing agent is applied, are more reflective, as described above. Part 312A is fused and is in the warming part of the build chamber while parts 312B and 312C are disposed in the fusing part of the chamber.

Thus, in FIG. 3, the warming heat 306 and fusing heat 308 are applied to the build material 106, including the parts 312. Because of the mismatch described, the build material, in which a part is absent, is reflecting heat away from the build material, as reflected heat 310A (to the left of part 312A), reflected heat 310B (between parts 312A and 312B), reflected heat 310C (between parts 312B and 312C), and reflected heat 310D (to the right of part 312C), shown as upward-facing solid arrows. Thus, while the parts 312 absorb the warming and fusing heat, as designed, a loss in the form of reflected heat 310 also occurs.

Figure 4:
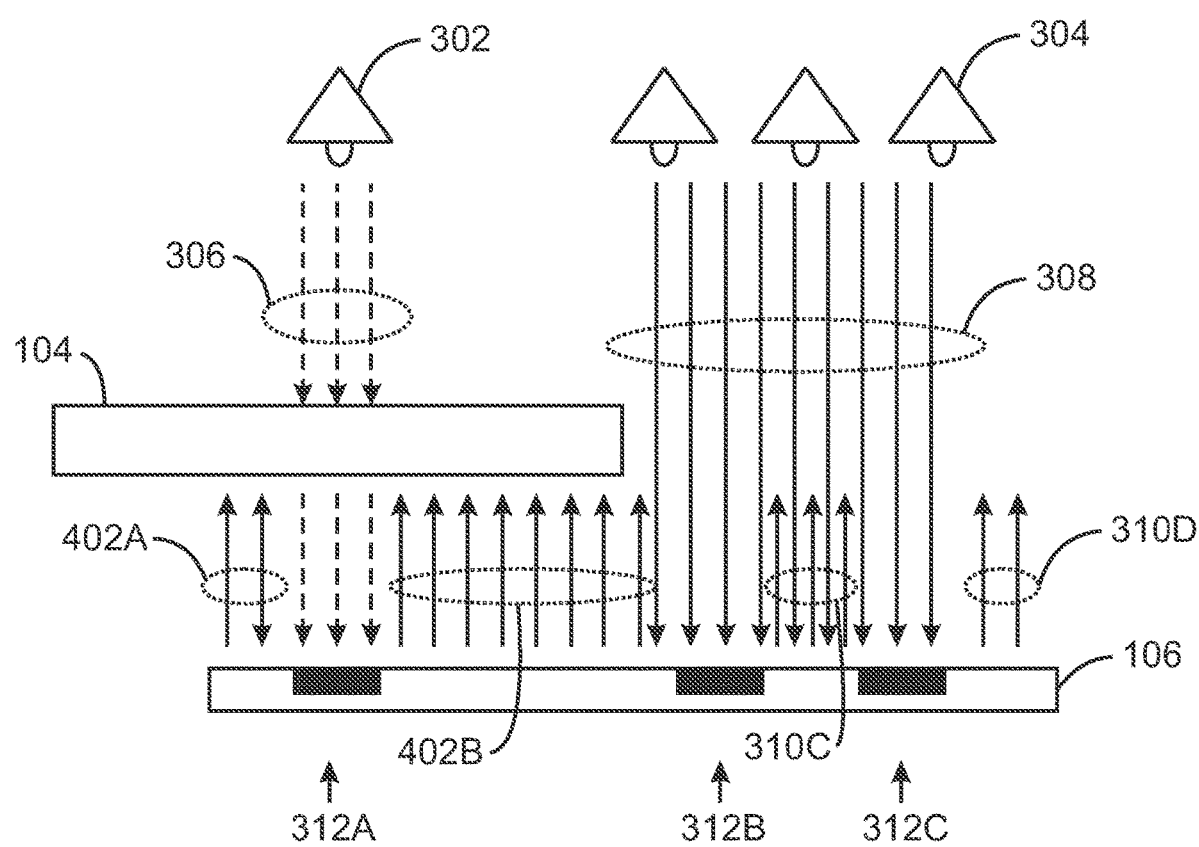
FIG. 4 is a simplified diagram of an apparatus to illustrate how the plate of FIG. 1 is able to capture lost heat, according to some examples.

FIG. 4 is a simplified diagram of an apparatus 400 to illustrate how the plate 104 of FIG. 1 is able to capture the reflected heat 310, according to some examples. As before, the warming lamp 302 is sending warming heat 306 and the fusing lamps 304 are sending fusing heat 308 in the direction of the build material 106. Parts 312 are formed by selective deposition of fusing agent upon the build material. The plate 104, disposed between the warming lamp 302 and the portion of the build material 106 featuring the part 312A, captures the warming heat 306 from the warming lamp 302. Fusing heat 308 from the fusing lamps 304 reaches a portion of the build material 106 featuring the parts 312B and 312C. Reflected heat 310A and 310B from FIG. 3 is now illustrated as captured reflected heat 402A and 402B (collectively, "captured reflected heat 402"), and does not escape, as before, but is directed to the plate 104. Reflected heat 310C and 310D, which are not below the plate 104, are not captured. In this manner, the plate 104 absorbs at least some of the heat reflected off the build material 106. The presence of the plate 104 enables the captured reflected heat 402 to be radiated back toward the build material 106, including the part 312A.

In some examples, the plate 104 comprises a material that is thermally conductive for uniform heat distribution. In one example, the plate 104 comprises an aluminum material. In a second example, the plate 104 comprises a ceramic material. In a third example, the plate comprises a composite material. Any one or more materials that provide thermal conductivity and uniform heat distribution may be good candidates for making the plate 104. Further, the plate 104 may be coated with an "Optical Black" coating, for effective broad spectrum energy absorption.

The plate 104 is both an absorber of infrared energy in the form of warming heat 306, from the warming lamp 302, and of reflected heat 402 from the build material 106. The combined energy absorption heats the plate 104. In some examples, the plate 104 is heated to approximately 500° K. In some examples, the plate 104 acts as a black body radiator with a color temperature much lower than that of the 1800 lamp or the 2750 lamp. In some examples, the plate 104 emits 98% of its energy in the highly absorptive region of the build material 106 above 3.0 um.

Figure 5A:
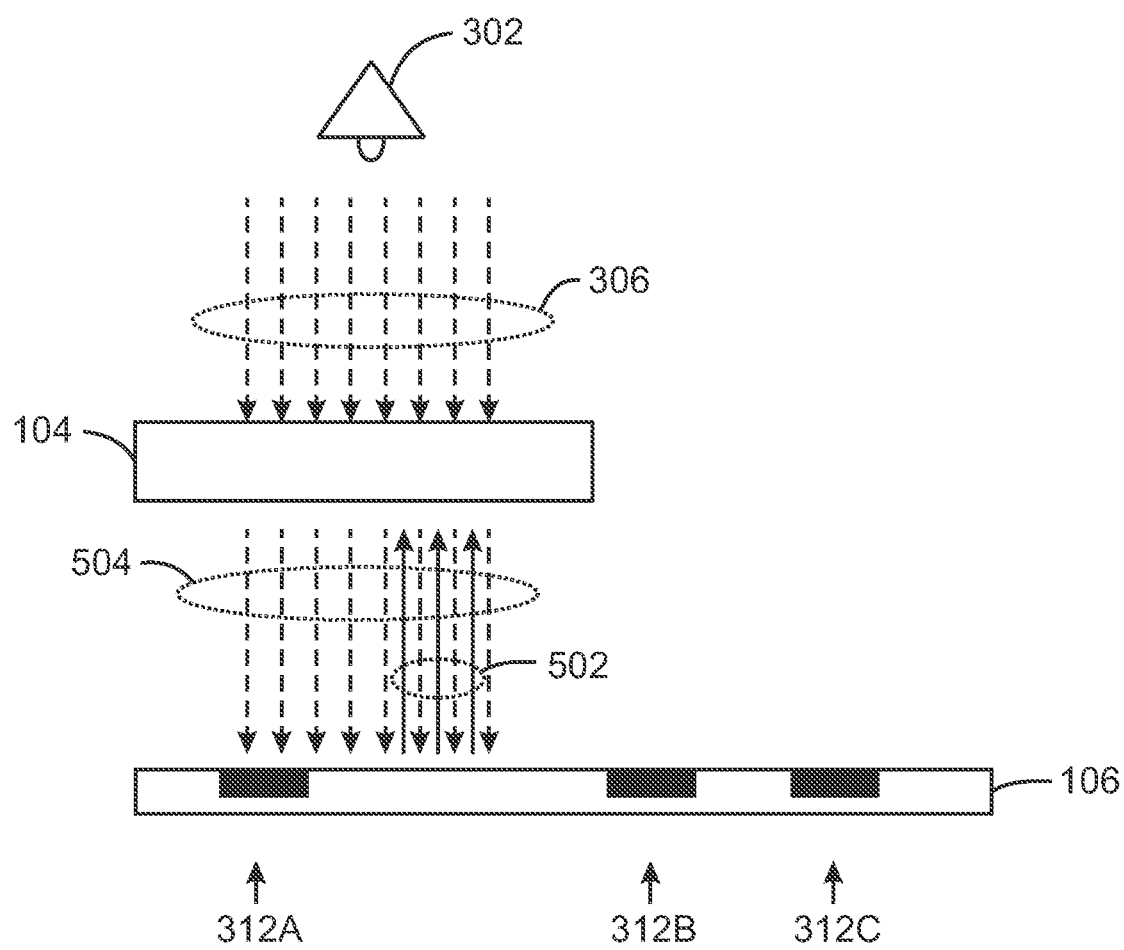
FIGS. 5A and 5B are simplified diagrams of apparatus to illustrate how the plate of FIG. 1 helps to both absorb heat and transmit the heat back to build material, according to some examples.
Figure 5B:
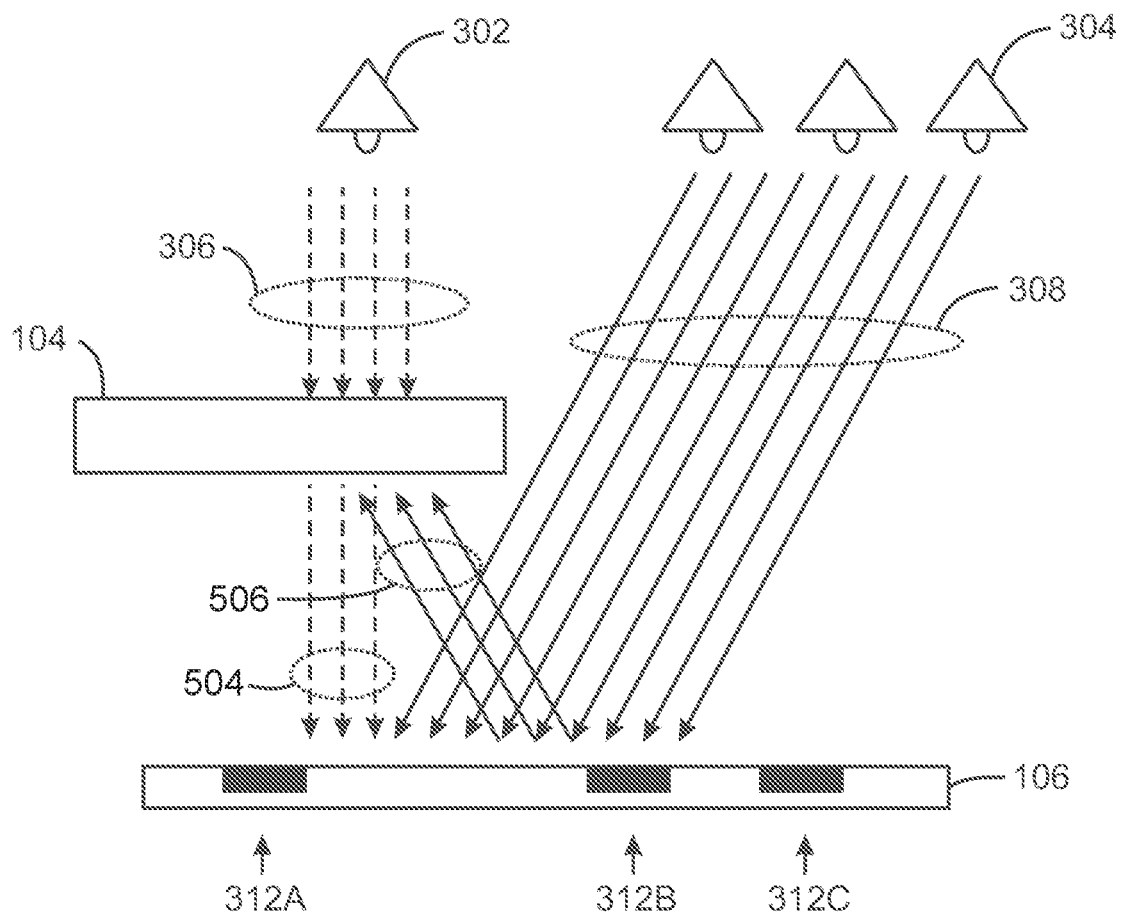

FIGS. 5A and 5B are simplified diagrams of an apparatus 500A and 500B, respectively, to illustrate how the plate 104 of FIG. 1 helps to both absorb heat and transmit the heat back to the build material 106 and part 312. The apparatus 500A includes the warming lamp 302 while the apparatus 500B includes both a warming lamp 302 and fusing lamps 304. The warming lamp 302 radiates warming heat 306 at a first emission spectrum toward the build material 106 and part 312, some of which is absorbed by the plate 104. Warming heat 504 at a second emission spectrum is transmitted from the plate 104 to the build material 106 and part 312.

Because of its reflectivity at the lower wavelengths, the build material 106 reflects some of the warming heat 504 at the second emission spectrum (shown as reflected heat 502), some of which is radiated toward the plate 104. The plate 104, having absorbed the warming heat 306 from the warming lamp at the first emission spectrum and the reflected heat 502 from the build material 106 at the second emission spectrum, radiates the energy as heat 504 back toward the build material. Thus, the heat received by the plate may consist of more than one emission spectrum, due to receiving both warming lamp heat and reflected heat at possibly a second emission spectrum.

In the apparatus 500B, the build material 106 and part 312 are receiving both warming heat 306 and fusing heat 308. The warming heat 306 at the first emission spectrum is radiated toward the build material 106 and part 312, some of which is absorbed by the plate 104. Warming heat 504 at a second emission spectrum is transmitted from the plate 104 to the build material 106 and part 312. Fusing heat 308 at a third emission spectrum is both absorbed by the part 312B and reflected off the build material 106. Reflected heat 506 is absorbed by the plate. Thus, the heat received by the plate may consist of more than one emission spectrum, due to receiving warming lamp heat, fusing heat, and reflected heat.

Figure 6:
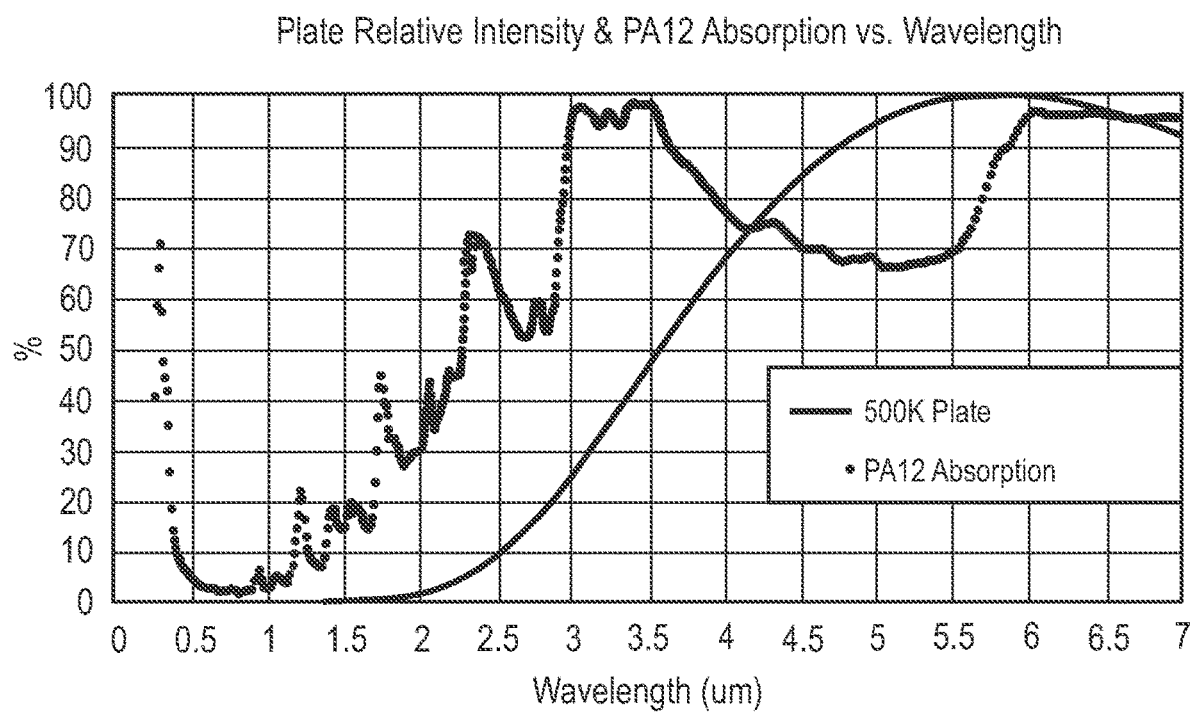
FIG. 6 is a graph illustrating the relative intensity of the plate of FIG. 1, as compared to the rate of absorption of a build material, according to examples.

FIG. 6 is a graph 600 illustrating the relative intensity of the plate 104, as compared to the rate of absorption of the PA12 build material, according to examples. Where the peak power for the 1800 and 2750 lamps are between 1 and 2 um, the plate 104, at approximately 500° K, has a peak power of about 5.7 um. The graph 600 thus shows an overlap in the absorption of the PA12 build material and the power emission of the plate 104, a significant shift, as compared to the intensity of the 1800 and 2750 lamps.

The graph 600 shows the spectral power emission of the plate 106, alongside the absorption of PA12 build material. In some examples, the plate 106 improves the absorption of emitted energy by the build material by 87%, which is a 3-6 times improvement over the absorption without the plate.

Figure 7:
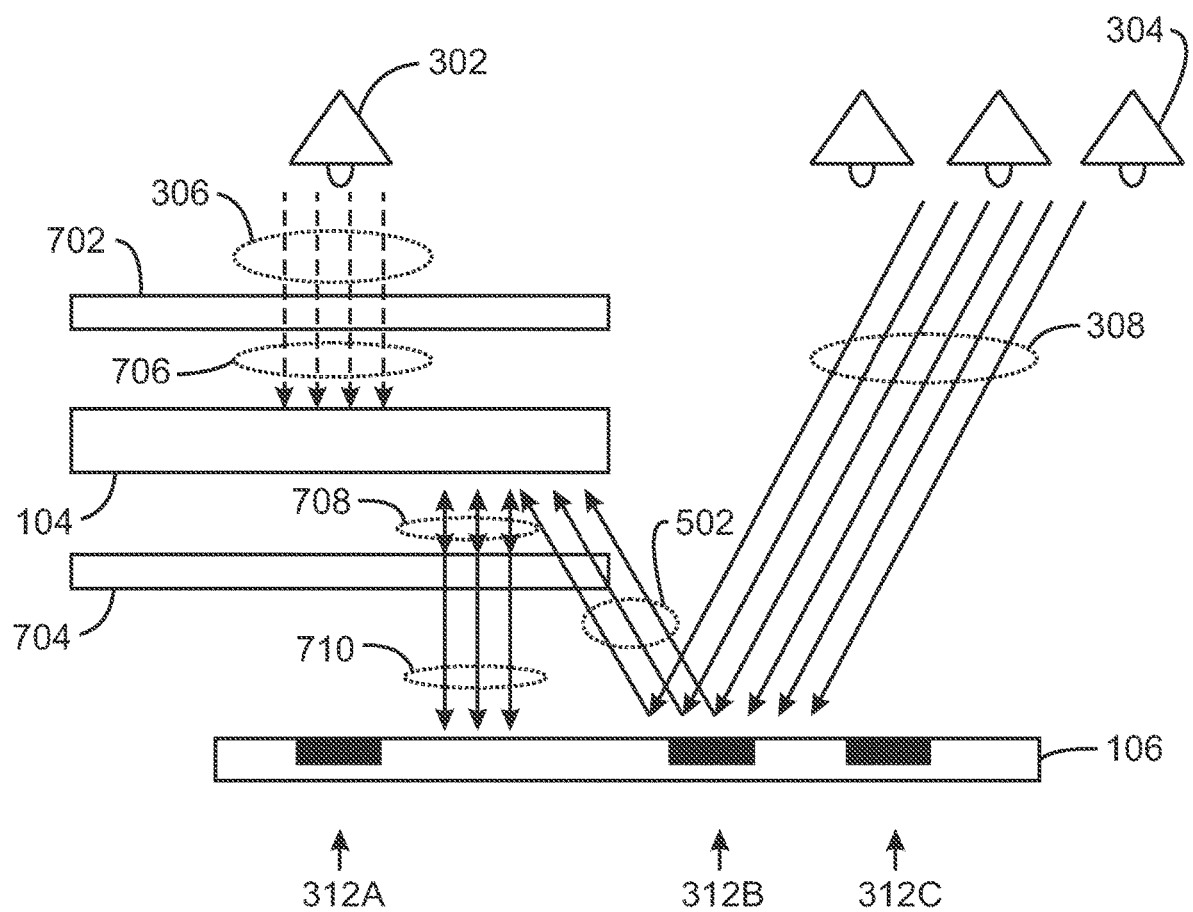
FIG. 7 is a simplified diagram of an apparatus capable of scavenging reflected heat of a build material using the plate of FIG. 1, according to examples.

FIG. 7 is a simplified diagram of an apparatus 700 capable of absorbing reflected heat of a build material using the plate 104 of FIG. 1, according to examples. The apparatus 700 features the plate 104, this time sandwiched between transparent plates 702 and 704. The transparent plates 702 and 704 facilitate capture of heat by the plate 104. For simplicity, not all build material 106 is shown being heated, and an abbreviation illustration of the energy or heat rays emitted from the lamps 302, 304 or reflected from the plate 104 is depicted.

From the warming lamp 302, warming heat/infrared energy 306 is transmitted down toward the build material 106. The warming heat 306 travels through the transparent plate 702 as passthrough warming heat 706, to be absorbed by the plate 104. From the fusing lamps 304, fusing heat 308 is transmitted down toward the build material 106. Some of the fusing heat 308 is absorbed by the part 312, while some of the fusing heat is reflected off the build material 106, shown as reflected heat 502, back toward the plate 104.

Because of the presence of the transparent plate 704, the reflected heat is captured between the plate 104 and the transparent plate, shown as captured reflected heat 708, which further warms the plate 104. The transparency of the plate 704 allows energy from the plate 104 to pass through to the build material 106 and part 312. Thus, the captured reflected heat 708 transmits downward toward the build material 106 as pass through captured heat 710.

In some examples, the transparent plates 702 and 704 are made of fused quartz. The apparatus 700 may include the transparent plate 704, for improved capture by the plate 104 of the reflected heat 502, but not the transparent plate 702. The apparatus 700 may include both transparent plates 702 and 704, for optimal capture of heat by the plate 104 from both the warming lamp 302 and the reflective build material 106.

Although the above illustrations in FIGS. 3, 4, 5, and 7 distinguish between warming heat 306 received from a warming lamp 302 and fusing heat 308 received from fusing lamps 304, the types of lamps may be swapped. In other words, reflected fusing heat 308 from fusing lamps 304 may be captured by the plate 104 while warming heat 306 is received by the part being warmed and reflected upward to be absorbed by the plate 104. Likewise, warming heat 306 from the warming lamp 302 may be reflected upward from the build material 106 to be captured by the plate 104 while fusing heat from the fusing lamps 304 is captured by the plate. Further, the plate 104 may be disposed directly under the warming lamp 302, as illustrated, or may be disposed directly under the fusing lamps 304, or may be disposed under both the warming lamp and the fusing lamps. Finally, the plate 104 may be moved so as to be disposed above different sections of the build material 106, or disposed under the fusing lamps 304 during a first time period and disposed under the warming lamp 302 during a second time period.

Figure 8A:
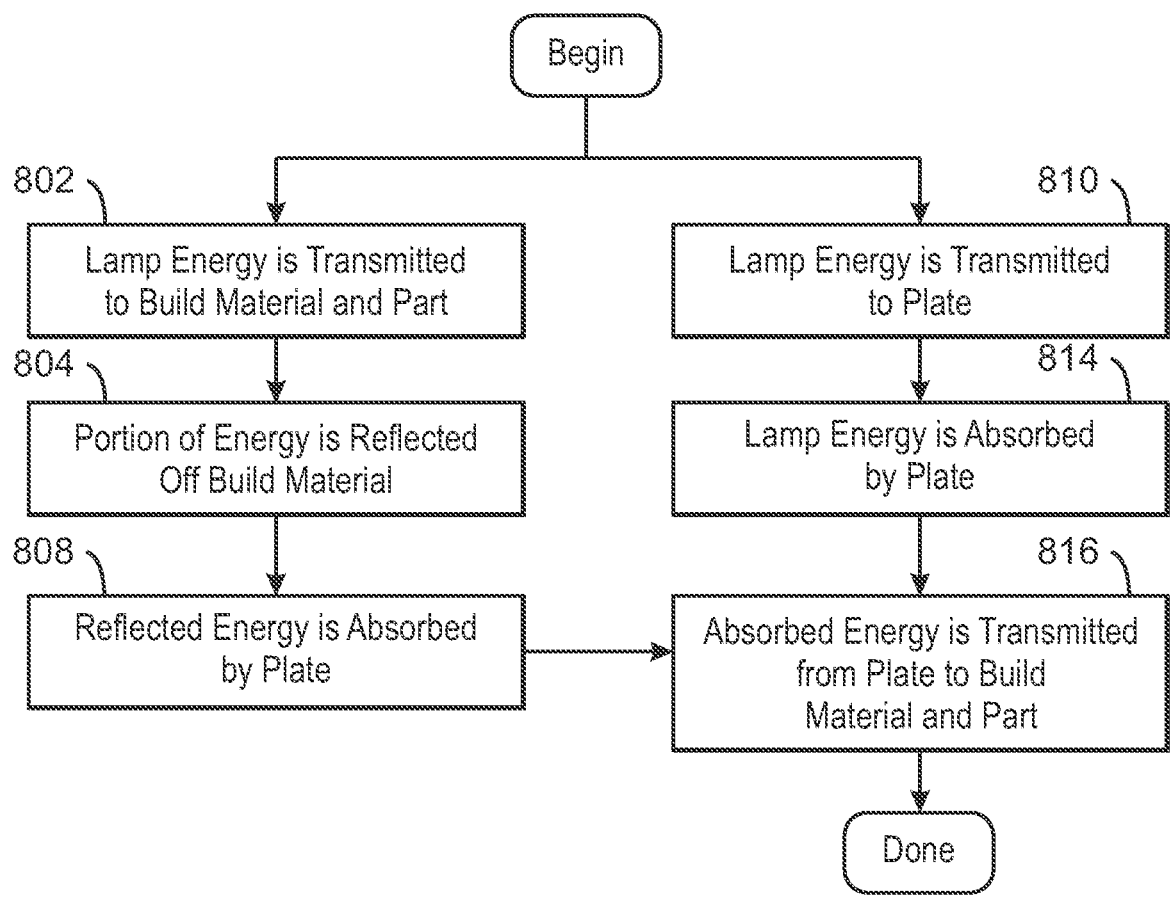
FIG. 8A is a flow diagram illustrating a method for increasing the efficiency of build material heating using the plate of FIG. 1, according to examples.
Figure 8B:
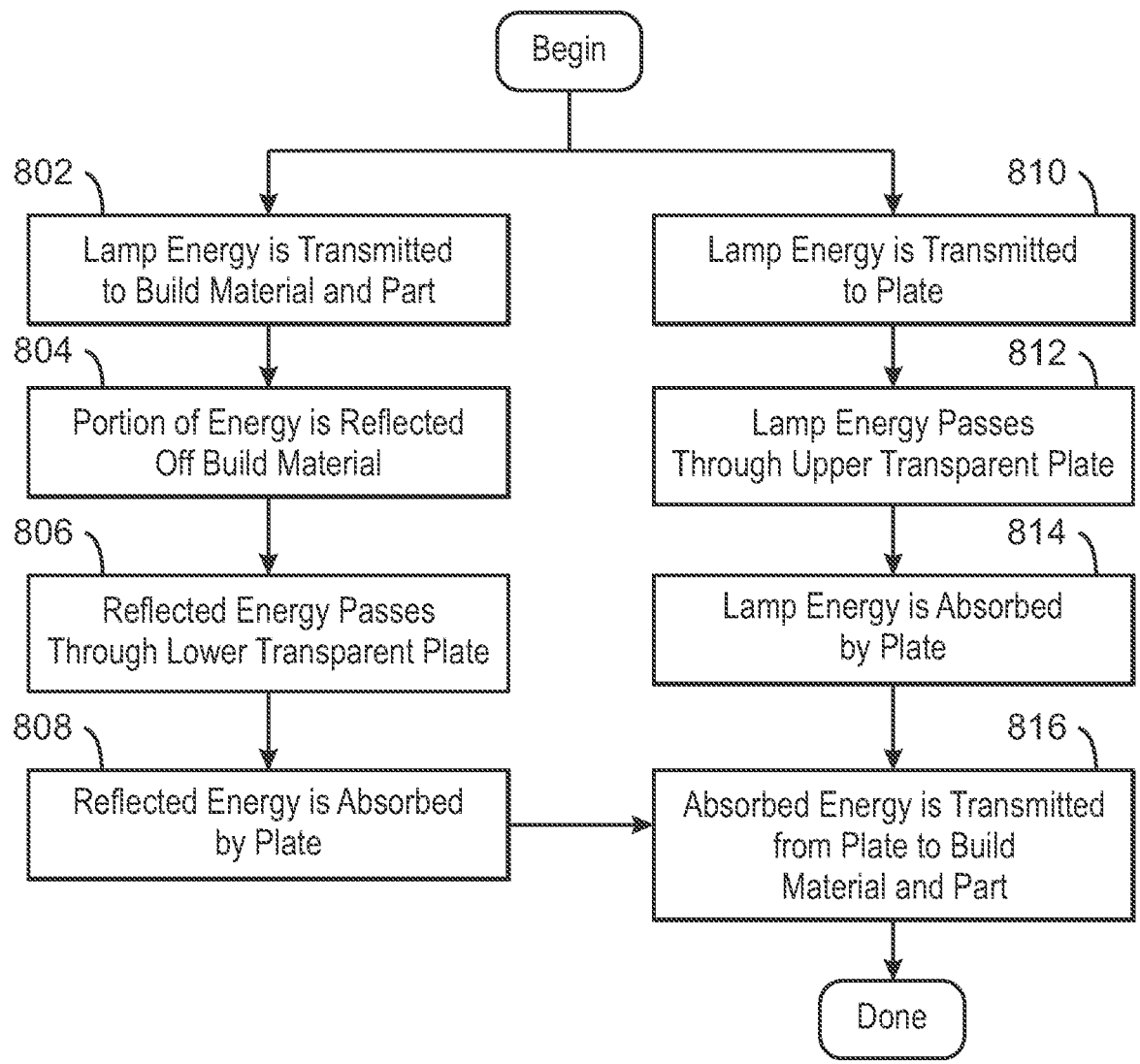
FIG. 8B is a flow diagram illustrating a method for increasing the efficiency of build material heating using the plate and transparent plates of FIG. 7, according to examples.

FIGS. 8A and 8B are flow diagrams illustrating methods 800A and 800B for increasing the efficiency of build material heating using the plate 104 of FIG. 1, according to examples. The method 800A utilizes the plate, such as the plate of FIG. 1, while the method 800B utilizes both the plate and adjacent transparent plates, such as in FIG. 7. The method shows two paths being taken. These paths may occur simultaneously or sequentially. Further, the lamp energy described by the method steps may comprise warming lamp energy, fusing lamp energy, or both.

In a first path, the lamp energy is transmitted to the build material and part (block 802). A portion of the transmitted energy is reflected off the build material (block 804). The emission spectrum of the transmitted energy and the reflected energy may be different, both are absorbed by the plate (block 808).

In a second path, the lamp energy is transmitted directly to the plate (block 810), and is absorbed by the plate (block 814). The absorbed energy of the plate is then transmitted to the build material (block 816). The method of increasing the efficiency of build material heating is complete.

In the method 800B, two transparent plates are disposed on either side of the plate, such as in the configuration of FIG. 7. The lamp energy is transmitted to the build material and part (block 802). A portion of the transmitted energy is reflected off the build material (block 804). The emission spectrum of the transmitted energy and the reflected energy may vary. The portion of energy that is reflected passes through the lower transparent plate (block 806). Both the transmitted energy and the reflected energy are absorbed by the plate (block 808).

In a second path, the lamp energy is transmitted to the plate (block 810), but first passes through the upper transparent plate (block 812). The emission spectrum of the transmitted energy and the reflected energy may be different, both are absorbed by the plate (block 814). The absorbed energy of the plate is then transmitted to the build material and part (block 816). The method of increasing the efficiency of build material heating is complete.

The method and the apparatus for increasing the efficiency build material heating provides an improved efficiency of build material heating, reduces a mismatch between the spectral power emissions of infrared sources (lamps) and common polymer build materials, and reduces power consumption due to the improved energy efficiency. Although the illustrations depict PA12 build material, these principles may be applied to other types of build materials used for additive manufacturing. Further, although 1800 and 2750 lamps are described here, these principles may be applied when using other types of lamps for additive manufacturing. The method and apparatus described herein reduces waste by recapturing unutilized fusing energy, reduces waste heat, and reduces exhaust temperatures of cooling air from the part being built. Such energy improvements may lessen the load of air conditioning system in the building where such additive manufacturing is taking place.

FIG. 9 is a simplified diagram of a fusing apparatus 900 for a multi-jet fusion printer, according to examples. The cross-sectional view shows three fusing lamps 904, which primarily melt portions of a build platform 914 where fusing agent has been applied to build material 918, resulting in an additive manufacturing part 912. In some examples, in regions where fusing agent has not been applied, nearly all of the fusing lamp energy is reflected. Energy 916 from the fusing lamps 904 passes through fused quartz 908 to be received by the build material 918 and part 912. Reflected energy 920 from the build material 918 is absorbed by the plate 910. Thus, directly emitted energy 916 from the fusing lamps 904 reflects off the bare build material (918) and is absorbed by the plate 910.

On the left side of the fusing apparatus 900, a warming lamp 902 heats a plate 910, with downward facing arrows indicating direct emitted energy or light 916. The direct emitted energy 916 passes through a fused quartz plate 906. In some examples, the warming lamp 902 above the plate 910 also supplies energy to the plate, to create a black body radiation temperature adequate to maintain the unprinted build material 918 at a desired temperature. The plate 910 is sandwiched between two plates 906 and 908 of fused quartz.

This allows the plate 910 to be isolated from convective cooling while allowing infrared energy to transmit.

While the present techniques may be susceptible to various modifications and alternative forms, the techniques discussed above have been shown by way of example. It is to be understood that the technique is not intended to be limited to the examples disclosed herein. Indeed, the present techniques include all alternatives, modifications, and equivalents falling within the scope of the following claims.

What is claimed is:

1. An apparatus comprising:
   a lamp to apply heat to a layer of build material when present on a build platform, wherein the build material is to absorb a first portion of the heat and reflect a second portion of the heat; and
   a plate disposed between the lamp and the build material, wherein the plate is to absorb, at a first side of the plate, heat transmitted to a surface of the plate from the lamp and absorb, at a second side of the plate, the second portion of the heat reflected by the build material to an opposite surface of the plate, and is to radiate the heat absorbed from the lamp to the build material and re-emit the second portion of the heat reflected by the build material back to the build material.

2. The apparatus of claim 1, wherein the plate comprises a first plate, and further comprising:
   a second plate disposed between the lamp and the first plate, wherein the second plate is transmissive to wavelengths of energy being emitted by the lamp.

3. The apparatus of claim 2, further comprising:
   a third plate disposed between the first plate and the build material, wherein a gap of air is disposed between the first plate and the third plate.

4. The apparatus of claim 3, wherein the second and third plates comprise fused quartz.

5. The apparatus of claim 1, further comprising:
   a coating disposed on all surfaces of the plate, wherein the coating supplies spectrum energy absorption of the plate.

6. A method comprising:
   absorbing, by a plate disposed between a lamp and build material on a target zone, energy transmitted to a surface of the plate at a first side of the plate from the lamp and energy reflected from the build material to an opposite surface of the plate at a second side of the plate; and
   emitting, to the build material, the transmitted energy absorbed by the plate at the first side and the reflected energy absorbed by the plate at the second side.

7. The method of claim 6, further comprising:
   heating the build material using the lamp, wherein the build material absorbs a first portion of the heat and reflects a second portion of the heat.

8. The method of claim 7, further comprising:
   absorbing, by the plate, the second portion of the heat.

9. The method of claim 6, further comprising:
   absorbing, by the plate, heat trapped between the plate and a glass plate disposed between the lamp and the plate.

10. An apparatus comprising:
    a lamp; and
    a plate disposed between the lamp and a layer of build material when formed on a build platform, the plate and the build material to be heated by the lamp, the plate to absorb energy transmitted to a surface of the plate at a first side of the plate by the lamp and absorb energy reflected from the build material to an opposite surface of the plate at a second side of the plate, and the plate to emit the absorbed energy from the lamp toward the build material and re-emit the reflected energy from the build material back to the build material.

11. The apparatus of claim 10, further comprising:
    a first fused quartz plate being disposed between the lamp and the plate; and
    a second fused quartz plate being disposed between the plate and the build material.

12. The apparatus of claim 10, further comprising:
    an optical black paint to be coated upon all surfaces of the plate.

13. The apparatus of claim 10, wherein the build material being heated comprises a PA12 polymer.

* * * * *